(12) United States Patent
Qiu et al.

(10) Patent No.: US 12,078,489 B2
(45) Date of Patent: Sep. 3, 2024

(54) WEIGHT AND REFERENCE QUATERNOIN CORRECTION UNSCENTED QUATERNOIN ESTIMATION METHOD

(71) Applicant: Hangzhou City University, Hangzhou (CN)

(72) Inventors: Zhenbing Qiu, Hangzhou (CN); Yanjun Li, Hangzhou (CN)

(73) Assignee: Hangzhou City University, Hangzhou (CN)

( * ) Notice: Subject to any disclaimer, the term of this patent is extended or adjusted under 35 U.S.C. 154(b) by 0 days.

(21) Appl. No.: 18/426,210

(22) Filed: Jan. 29, 2024

(65) Prior Publication Data

US 2024/0175685 A1    May 30, 2024

Related U.S. Application Data

(63) Continuation of application No. PCT/CN2023/114183, filed on Aug. 22, 2023.

(30) Foreign Application Priority Data

Nov. 15, 2022 (CN) .......................... 202211423293.5

(51) Int. Cl.
  *G01C 21/20* (2006.01)
  *G01C 21/24* (2006.01)
(52) U.S. Cl.
  CPC .................................. *G01C 21/20* (2013.01)
(58) Field of Classification Search
  CPC ...... G01C 21/24; G01C 21/20; G01C 21/165; G01C 21/16; G01C 21/02; G01C 19/02; G01P 15/00; G01P 15/14; G01P 21/00; G01P 3/00; G01R 33/0035; G01R 33/028; G01R 33/0206
  USPC .......... 73/503.3, 504.03, 488; 244/165, 164, 244/171; 701/13, 480, 1, 3, 32.8, 4, 501, 701/505, 519, 472, 510, 509, 536, 535, 701/534, 479; 702/150, 104, 151, 92, 96,
  (Continued)

(56) References Cited

FOREIGN PATENT DOCUMENTS

| CN | 105300384 A | 2/2016 |
|---|---|---|
| CN | 106767837 A | 5/2017 |
| CN | 108225337 A | 6/2018 |

(Continued)

OTHER PUBLICATIONS

Internation Search Report of PCT/CN2023/114183, Mailed Nov. 24, 2023.

(Continued)

*Primary Examiner* — Jeffrey P Aiello

(57) ABSTRACT

The invention relates to a weight and reference quaternion correction unscented quaternion estimation method, comprising: obtaining measurement data as quantity measurement through a gyro and a star sensor; establishing a quaternion-based discrete spacecraft nonlinear state space model; estimating an error quaternion, a gyro drift and a corresponding error covariance at a k moment by using an unscented quaternion estimator based on parameter and reference quaternion correction at a k-1 moment; and setting a filtering time as $N_{time}$, if $k<N_{time}$, then repeating the step 3, if $k=N_{time}$, then finishing filtering, and outputting the attitude quaternion, the gyro drift and the corresponding error covariance.

5 Claims, 4 Drawing Sheets

(58) Field of Classification Search
USPC ... 702/145, 153, 142, 94, 152, 196, 95, 175, 702/190, 188, 189
See application file for complete search history.

(56) References Cited

FOREIGN PATENT DOCUMENTS

| | | |
|---|---|---|
| CN | 110109470 A | 8/2019 |
| CN | 113074753 A | 7/2021 |
| JP | 2004224171 A | 8/2004 |

OTHER PUBLICATIONS

Huaming Qian et al., "Iterated Unscented Kalman Filter for Spacecraft Attitude Estimation" Proceedings of the 37th Chinese Control Conference, Oct. 7, 2018, Parts 1-4.

Zhenbing Qiu, "Research on Spacecraft Attitude Estimation Method Based on Nonlinear Filtering Algorithm", Engineering Technology vol. II (Issue 03).

WEIGHT AND REFERENCE QUATERNOIN CORRECTION UNSCENTED QUATERNOIN ESTIMATION METHOD

CROSS-REFERENCE TO RELATED APPLICATIONS

This application is a continuation of International Patent Application No. PCT/CN2023/114183 with a filing date of Aug. 22, 2023, designating the United States, now pending, and further claims priority to Chinese Patent Application No. 202211423293.5 with a filing date of Nov. 15, 2022. The content of the aforementioned applications, including any intervening amendments thereto, are incorporated herein by reference.

TECHNICAL FIELD

The present invention relates to the technical field of attitude estimation, and particularly to a weight and reference quaternion correction unscented quaternion estimation method.

BACKGROUND OF THE PRESENT INVENTION

The most important parameters to describe a spacecraft attitude comprise an Euler angle, a direction cosine, a generalized Rodrigue parameter and a quaternion, wherein the quaternion is the most concerned because of no singularity and simple calculation, and the quaternion is widely used in an attitude estimation system. A quaternion-based spacecraft attitude estimation model has high nonlinear characteristics, especially a measurement model is established by a nonlinear function, so the attitude estimation is essentially a nonlinear filtering problem. In addition, the quaternion has a normalization constraint problem. To solve the above problem, an Extended Kalman Filter (EKF) has become the most widely used nonlinear filtering algorithm for the attitude estimation system, for example, a multiplicative extended Kalman filter (MEKF), a Backwards-Smoothing Extended Kalman Filter (BSEKF) and a Norm-constrained Extended Kalman Filter (NEKF), which are proposed successively. However, the Extended Kalman Filter truncates A higher-order term of Taylor expansion, and the estimation accuracy is limited. Generally, this kind of algorithm only has a satisfactory filtering result under the condition of small initial error. Therefore, it is necessary to study a new nonlinear filtering algorithm, such as Unscented Quaternion Estimator (USQUE), Sparse Gauss-Hermite Quadrature Filter (SGHQF) and Particle Filter (PF) algorithms, which are proposed later. However, the SGHQF and PF algorithms have a large amount of calculation, wherein the unscented quaternion estimator adopts a method for transforming between a generalized Rodrigue parameter and a quaternion to avoid a quaternion normalization constraint problem, thus effectively solving a predicted mean and a corresponding covariance. However, the reference quaternion selection and the parameter setting in this kind of algorithm need to be further revised. For the unscented Kalman filter, the reference quaternion for calculating and updating the quaternion should be the mean value of the one-step prediction quaternion. However, a method for determining the mean quaternion comprises a singular value decomposition method and a feature vector-based method. On this basis, a Lagrange function method is a relatively simple method to solve the weighted mean value of a multiplicative quaternion. In addition, a plurality of parameters in the unscented Kalman filter need to be set according to the actual environment, and the attitude estimation problem is different from most kinds of problems such as an univariate model and a target tracking, which is relatively more complicated, and the set parameter has a very obvious influence on the algorithm effect. Therefore, based on the above discussion, it is of great theoretical and practical significance to study a weight and reference quaternion correction unscented quaternion estimation method to improve the estimation accuracy and stability of an attitude estimation system.

SUMMARY OF THE PRESENT INVENTION

The present invention aims at overcoming the shortcomings in the prior art, and provides a weight and reference quaternion correction unscented quaternion estimation method (CUSQUE) in order to improve the estimation accuracy and stability of an attitude estimation system, comprising:

step 1: obtaining measurement data as quantity measurement through a gyro and a star sensor;

step 2: establishing a quaternion-based discrete spacecraft nonlinear state space model;

step 3: estimating an error quaternion, a gyro drift and a corresponding error covariance at a k moment by using an unscented quaternion estimator based on parameter and reference quaternion correction at a k−1 moment; and step 4: setting a filtering time as $N_{time}$, if $k<N_{time}$, then repeating the step 3, if $k=N_{time}$, then finishing filtering, and outputting the attitude quaternion, the gyro drift and the corresponding error covariance;

preferably, step 2 comprises:

step 2.1: establishing a discrete quaternion state motion equation of a spacecraft;

$$\hat{q}_{k|k-1} = \Omega[\hat{\omega}_{k-1}]\hat{q}_{k-1}$$

$$\Omega[\hat{\omega}_{k-1}] = \begin{bmatrix} \cos(0.5\|\hat{\omega}_{k-1}\|\Delta t)I_{3\times 3} - [\psi_{k-1}\times] & \psi_{k-1} \\ -\psi_{k-1}^T & \cos(0.5\|\hat{\omega}_{k-1}\|\Delta t)I_{3\times 3} \end{bmatrix}$$

$$\psi_{k-1} = \frac{\sin(0.5\|\hat{\omega}_{k-1}\|\Delta t)\hat{\omega}_{k-1}}{\|\hat{\omega}_{k-1}\|}$$

wherein $q=[q_1\ q_2\ q_3\ q_4]^T$ represents a quaternion vector, $\Omega[\cdot]$ and $\psi_{k-1}$ represent function symbols at the k−1 moment, $\omega=[\omega_1\ \omega_2\ \omega_3]^T$ represents a gyro three-axis angular velocity output vector, $\hat{\omega}_{k-1}$ represents an angular velocity estimation value at the k−1 moment, $\hat{q}_{k-1}$ represents an estimation value of an attitude quaternion q at the k−1 moment, $I_{3\times 3}$ represents an unit matrix of 3×3, $\Delta t$ represents a gyro sampling interval, $\|\cdot\|$ represents a vector norm, $\psi_{k-1}^T$ represents transposition of $\psi_{k-1}$, and $[\psi_{k-1}\times]$ represents an antisymmetry matrix of $[\psi_{k-1}\times]$;

step 2.2: establishing a discrete angular velocity measurement model:

$$\tilde{\omega}_k = \omega_k + \frac{1}{2}[\beta_k + \beta_{k-1}] + \left[\frac{\sigma_v^2}{\Delta t} + \frac{1}{12}\sigma_u^2\Delta t\right]^{1/2} N_v$$

$$\beta_k = \beta_{k-1} + \sigma_u \Delta t^{1/2} N_u$$

wherein, $\tilde{\omega}_k$ represents a gyro output value at the k moment, $\omega_k$ represents a real gyro value at the k moment, $\beta_x$ represents a gyro drift at the k moment, $\sigma_v^2$ and $\sigma_u^2$ represents mean square errors of a gyro measurement noise and a drift noise, $N_v$ and $N_u$ represent a Gaussian white noise with a mean value of zero and a unit array with a variance of three dimensions;

step 2.3: establishing a star sensor observation model:

$$z_k = \begin{bmatrix} A(q)r_1 \\ A(q)r_2 \\ \vdots \\ A(q)r_L \end{bmatrix}_k + \begin{bmatrix} v_1 \\ v_2 \\ \vdots \\ v_L \end{bmatrix}_k$$

wherein $z_k$ represents a quantity measurement, $r_i$ represent an ith reference vector, i=1, ..., L, L represents a number of fixed stars observed by the star sensor; $v_i$ represents a zero-mean Gaussian white noise, with a covariance of $\sigma_i^2 I_{3\times3}$, while all $v_i$ covariances constitute a measurement variance $R_k$; and A(q) represents an attitude matrix, which is defined as follows:

$$A(q) = (q_4^2 - \rho^T\rho)I_{3\times3} + 2\rho\rho^T - 2q_4[\rho\times]$$

wherein $\rho = [q_1\ q_2\ q_3]^T$ represents a quaternion vector part, and $[\rho\times]$ represents an antisymmetric matrix of $\rho$;

preferably, step 3 comprises:

step 3.1.1: calculating a sigma point and a corresponding weight at the k−1 moment, $$\chi_{0,k} = \hat{x}_k$$
$$\chi_{i,k} = \hat{x}_k + \left[\sqrt{(n+\kappa)(P_k+Q_k)}\right]_i, i = 1, \ldots, n$$
$$\chi_{i,k} = \hat{x}_k - \left[\sqrt{(n+\kappa)(P_k+Q_k)}\right]_i' i = n+1, \ldots, 2n$$
$$w_0^m = \frac{\kappa}{(n+\kappa)}$$
$$w_0^c = \frac{\kappa}{(n+\kappa)}$$
$$w_i^m = w_i^c = \frac{1}{2(n+\kappa)}, i = 1, \ldots, 2n$$

wherein $(\sqrt{P_k})_i$ represents an ith column of $\sqrt{P_k}$, $w_0^m$, $w_0^c$, $w_i^m$ and $w_i^c$ represent the weights, n represents a state dimension, $\kappa$ represents an unscented Kalman filtering adjustment parameter, and $Q_k$ is a process noise, which is defined as follows:

$$Q_k = \frac{\Delta t}{2}\begin{bmatrix} \left(\sigma_v^2 - \frac{1}{6}\sigma_u^2\Delta t^2\right)I_{3\times3} & 0_{3\times3} \\ 0_{3\times3} & \sigma_u^2 I_{3\times3} \end{bmatrix}$$

dividing the sigma point into an attitude error part and a gyro drift part;

$$\chi_{i,k} = \begin{bmatrix} \chi_{i,k}^{\delta p} \\ \chi_{i,k}^{\beta} \end{bmatrix}, i = 0, 1, \ldots, 2n$$

step 3.1.2: calculating the quaternion to be propagated:

$$\hat{q}_{i,k-1} = \delta q_{i,k-1} \otimes \hat{q}_{0,k-1}, i=1,2\ldots,2n$$

wherein $\otimes$ represents a quaternion product, and the error quaternion $\delta q_{i,k-1} = [\delta\rho_{i,k-1}^T\ \delta q_{i,4_{k-1}}]^T$, $\delta q_{i,4_{k-1}}$ and $\delta\rho_{i,k-1}$ are calculated by the following formula:

$$\delta q_4 = \frac{-a\|\delta p\|^2 + f\sqrt{f^2 + (1-a^2)\|\delta p\|^2}}{f^2 + \|\delta p\|^2}$$

$$\delta\rho = f^{-1}[a + \delta q_4]\delta p$$

wherein $\delta(\bullet)$ represents an error, $f^{-1}$ represents an inverse of f, and a and f represent generalized Rodrigue parameters.

step 3.2: updating the quaternion by using the discrete quaternion motion equation:

$$\hat{q}_{i,k|k-1} = \Omega[\hat{\omega}_{i,k-1}]\hat{q}_{i,k-1}, i=0,1,\ldots 2,n$$

then the error quaternion being obtained by the quaternion product:

$$\delta q_{i,k|k-1} = \hat{q}_{i,k|k-1} \otimes (\hat{q}_{0,k|k-1})^{-1}, i=1,\ldots,2n$$

the sigma point $X_{i,k|k-1}^{\delta p}$ of the attitude error part being solved by the following formula, $\delta p$ representing the generalized Rodrigue parameter:

$$\delta p \equiv f\frac{\delta\rho}{a + \delta q_4}$$

step 3.3: calculating the reference quaternion according to the following equation:

$$N(q_{1,k|k-1}, \ldots, q_{2n,k|k-1})\hat{q}_{i,k|k-1} = \lambda\hat{q}_{i,k|k-1},$$
$$i=0,\ldots,2n$$

wherein $$N(q_{1,k|k-1}, \ldots, q_{2n,k|k-1}) = \sum_{i=1}^{2n} Z(q_{i,k|k-1})W_i Z^T(q_{i,k|k-1}),$$

$$Z(q_{i,k|k-1}) = \begin{bmatrix} q_{4_{i,k|k-1}}I_{3\times3} + [\rho_{i,k|k-1}\times] \\ -\rho_{i,k|k-1}^T \end{bmatrix}, W_i = \frac{I_{3\times3}}{2n},$$

$\lambda$ refers to a Lagrangian multiplicative factor, and an eigenvector corresponding to the minimum eigenvalue in a solution of equation is set as a reference quaternion $\bar{q}_{k|k-1}$;

step 3.4: propagating the gyro drift:

$$\chi_{i,k|k-1}^{\beta} = \chi_{i,k-1}^{\beta}, i=0,1,\ldots,2n$$

step 3.5: estimating one-step prediction state and a corresponding error covariance as follows:

$$\hat{x}_{k|k-1} = \sum_{i=0}^{2n} w_i^m \chi_{i,k|k-1}$$

$$P_{k|k-1} = \sum_{i=0}^{2n} w_i^c(\chi_{i,k|k-1} - \hat{x}_{k|k-1})(\chi_{i,k|k-1} - \hat{x}_{k|k-1})^T + Q_{k-1}$$

step 3.6: updating the measurement, comprising:

step 3.6.1: recalculating the weight corresponding to the sigma point in the measurement updating part:

$$w_0^m = w_0^c = \varsigma$$
$$w_i^m = w_i^c = \frac{1}{2n}, i = 1, \ldots, 2n$$

wherein $\varsigma$ represents the unscented Kalman filtering adjustment parameter;

step 3.6.2: calculating the sigma point:

$$\gamma_{i,k|k-1} = \begin{bmatrix} A(\hat{q}_{i,k|k-1})r_1 \\ A(\hat{q}_{i,k|k-1})r_2 \\ \vdots \\ A(\hat{q}_{i,k|k-1})r_L \end{bmatrix}, i = 0, \ldots, 2n$$

and step 3.6.3: calculating the one-step measurement prediction $\hat{z}_{k|k-1}$, the one-step measurement prediction variance $P_{zz,k|k-1}$ and the cross covariance $P_{xz,k|k-1}$ as follows:

$$\hat{z}_{k|k-1} = \sum_{i=0}^{2n} w_i^m \gamma_{i,k|k-1}$$

$$P_{zz,k|k-1} = \sum_{i=0}^{2n} w_i^c (\gamma_{i,k|k-1} - \hat{z}_{k|k-1})(\gamma_{i,k|k-1} - \hat{z}_{k|k-1})^T + R_k$$

$$P_{xz,k|k-1} = \sum_{i=0}^{2n} w_i^c (\chi_{i,k|k-1} - \hat{x}_{k|k-1})(\chi_{i,k|k-1} - \hat{x}_{k|k-1})^T$$

step 3.7: calculating a filtering gain, a state vector and a corresponding error covariance at the k moment:

$$K_k = P_{xz,k|k-1} P_{zz,k|k-1}^{-1}$$

$$\hat{x}_k = \hat{x}_{k|k-1} + K_k(z_k - \hat{z}_{k|k-1})$$

$$P_k = P_{k|k-1} - K_k P_{zz,k|k-1} K_k^T$$

step 3.8: updating the quaternion:

$$\hat{x}_k = [\delta \hat{p}_k^T \hat{\beta}_k^T]^T$$

solve the error quaternion $\delta q_k = [\delta p_k^T \; \delta q_{4,k}]^T$ according to the formula of $$\delta q_{i,4_{k-1}} \text{ and } \delta p_{i,k-1}$$

in the step 3.1.2; according to the quaternion product, and using the eigenvector corresponding to the minimum eigenvalue obtained in the formula in the step 3.3 as the reference quaternion, then solving the quaternion at the k moment as follows:

$$\hat{q}_k = \delta q_k \otimes \bar{q}_{k|k-1}$$

and step 3.9: resetting $\delta \hat{p}_k$ as a zero vector to prepare for a next filtering cycle.

Preferably, in the step 3, the weight parameter is $\kappa = -3$, $\varsigma = 0$, and the generalized Rodrigue parameter is a=1, f=4.

Preferably, in the step 4, the filtering time is $N_{time}$=90 min.

The present invention has the beneficial effects that:
(1) the present invention adopts the mean and variance of the unscented transformation theory approximate nonlinear function, which can avoid calculating a Jacobian matrix and is beneficial to improving the accuracy of attitude estimation and the stability of the algorithm.
(2) in the time update and measurement update, the present invention sets the different weights, which not only improves the accuracy of attitude estimation, but also is beneficial to reducing the calculation amount of the algorithm.
(3) the present invention uses the Lagrange function method to solve the weighted mean value of quaternion, and uses it as the reference quaternion for solving the updated quaternion, which is beneficial to improving the accuracy of attitude estimation and the stability of the algorithm.

DETAILED DESCRIPTION OF PREFERRED EMBODIMENTS

Figure 1:
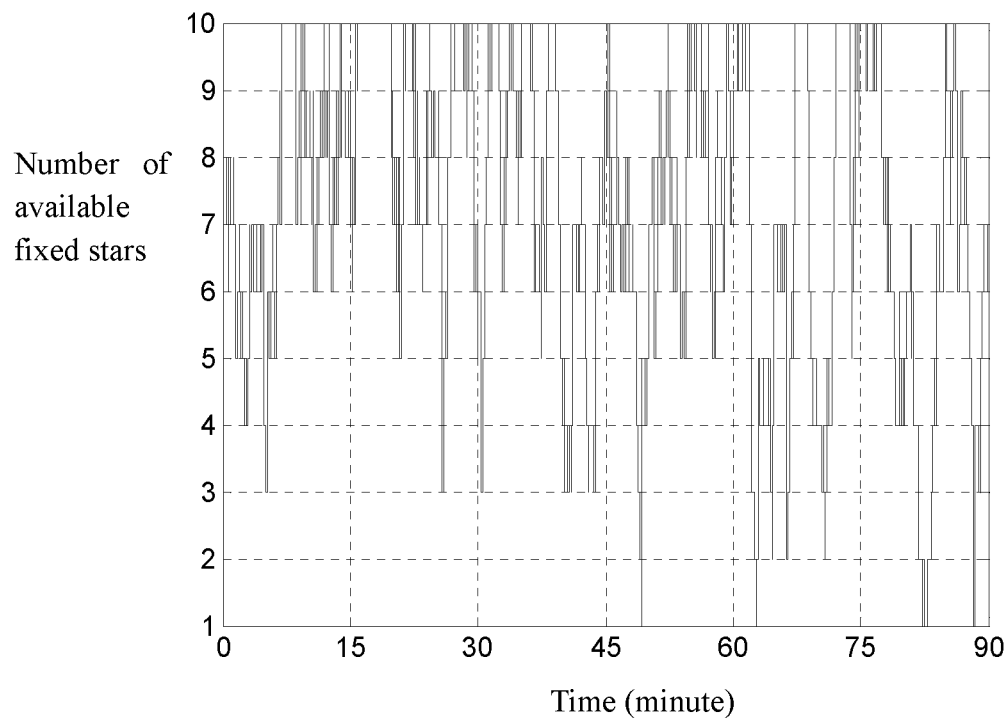
FIG. 1 is a number result diagram of available fixed stars observed by a star sensor in simulation.
Figure 2:
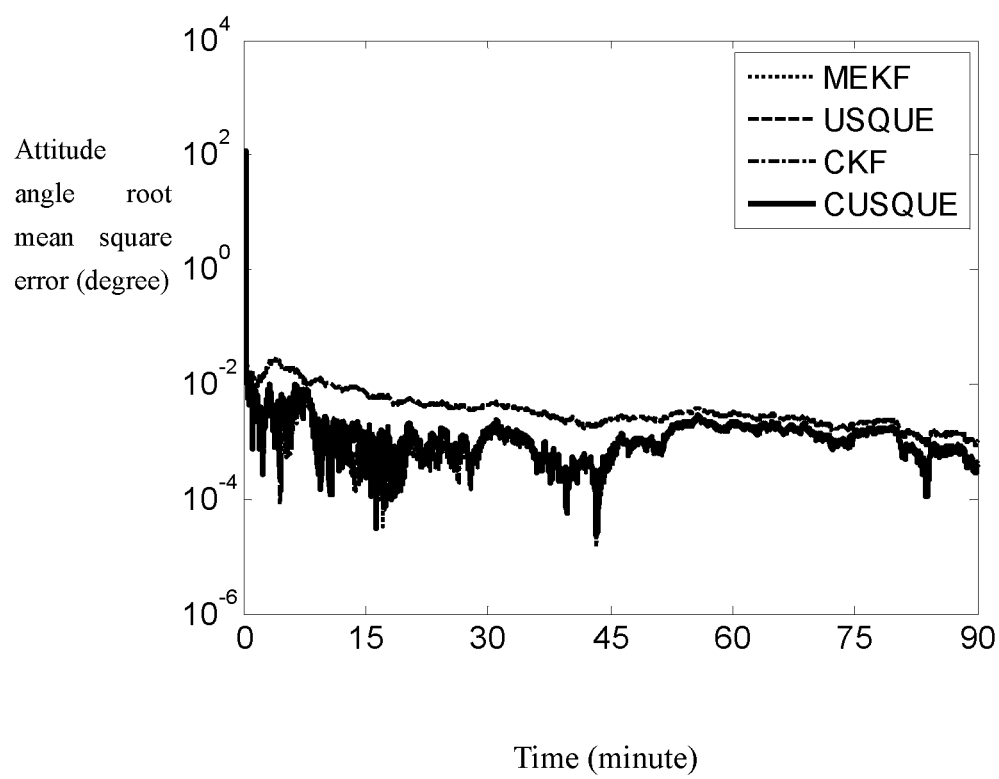
FIG. 2 is a comparison diagram of an filtering estimation attitude angle root mean square error results under an initial condition error situation in a case 1.
Figure 3:
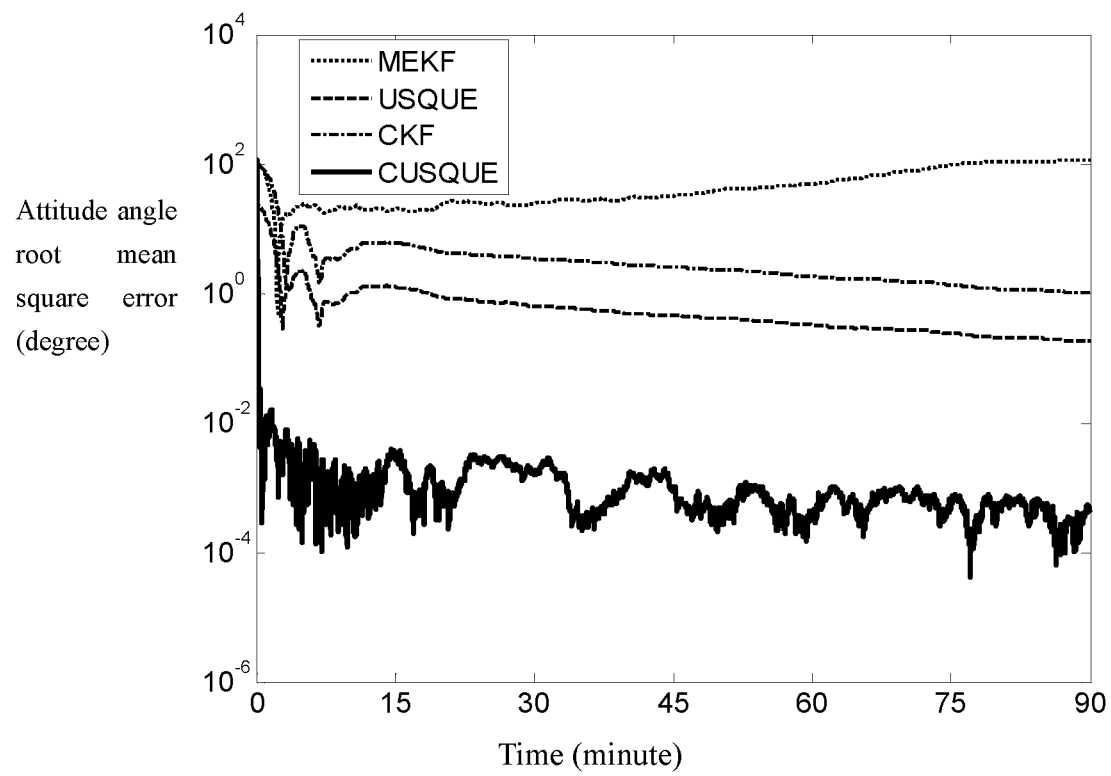
FIG. 3 is a comparison diagram of an filtering estimation attitude angle root mean square error results under the initial condition error situation in a case 2.
Figure 4:
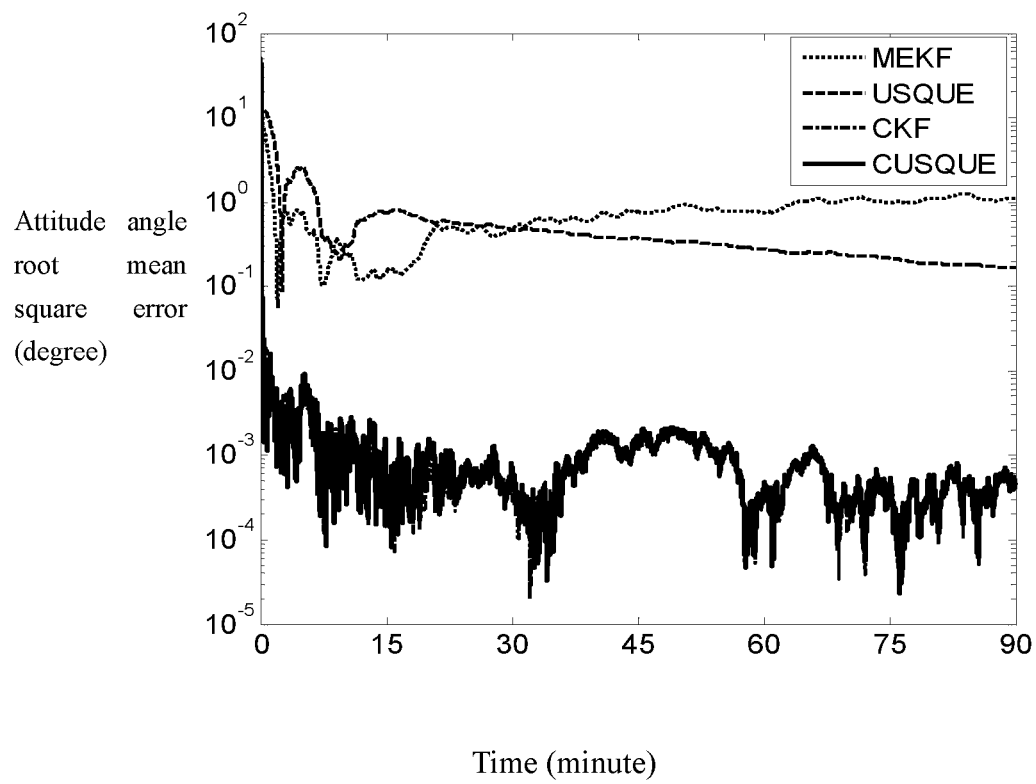
FIG. 4 is a comparison diagram of an filtering estimation attitude angle root mean square error results under the initial condition error situation in a case 3.
Figure 5:
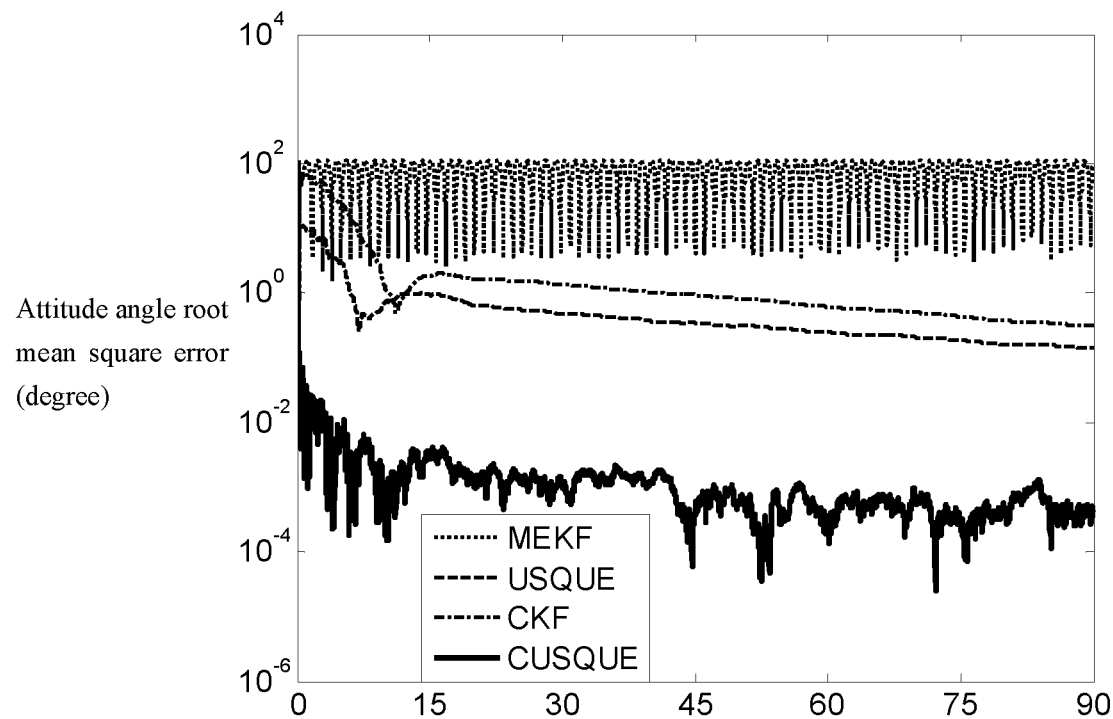
FIG. 5 is a comparison diagram of an filtering estimation attitude angle root mean square error results under the initial condition error situation in a case 4.

The present invention will be further described in conjunction with the embodiments. The description of the following embodiment is only for the assistance in understanding the present invention. It should be pointed out that, for those ordinary people in the technical field, several modifications can be made to the present invention without departing from the principle of the present invention, and these improvements and modifications also fall within the protection scope of the claims of the present invention.

As one embodiment, the application provides a weight and reference quaternion correction unscented quaternion estimation method, comprising:

step 1: obtaining measurement data as quantity measurement through a gyro and a star sensor;

step 2: establishing a quaternion-based discrete spacecraft nonlinear state space model;

step 3: estimating an error quaternion, a gyro drift and a corresponding error covariance at a k moment by using an unscented quaternion estimator based on parameter and reference quaternion correction at a k−1 moment; and step 4: setting a filtering time as $N_{time}$, if k<$N_{time}$, then repeating the step 3, if k=$N_{time}$, then finishing filtering, and outputting the attitude quaternion, the gyro drift and the corresponding error covariance The step 2 comprises:

step 2.1: establishing a discrete quaternion state motion equation of a spacecraft;

$$\hat{q}_{k|k-1} = \Omega[\hat{\omega}_{k-1}]\hat{q}_{k-1}$$

$$\Omega[\hat{\omega}_{k-1}] = \begin{bmatrix} \cos(0.5\|\hat{\omega}_{k-1}\|\Delta t)I_{3\times 3} - [\psi_{k-1}\times] & \psi_{k-1} \\ -\psi_{k-1}^T & \cos(0.5\|\hat{\omega}_{k-1}\|\Delta t)I_{3\times 3} \end{bmatrix}$$

$$\psi_{k-1} = \frac{\sin(0.5\|\hat{\omega}_{k-1}\|\Delta t)\hat{\omega}_{k-1}}{\|\hat{\omega}_{k-1}\|}$$

wherein $q=[q_1\ q_2\ q_3\ q_4]^T$ represents a quaternion vector, $\omega=[\omega_1\ \omega_2\ \omega_3]^T$ represents a gyro three-axis angular velocity output vector, $\hat{q}_{k-1}$ represents an estimation value of an attitude quaternion q at the k−1 moment, $I_{3\times3}$ represents an unit matrix of 3×3, $\Delta t$ represents a gyro sampling interval, $\|\cdot\|$ represents a vector norm, $\psi_{k-1}{}^T$ represents transposition of $\psi_{k-1}$, and $[\psi_{k-1}\times]$ represents an antisymmetry matrix of $[\psi_{k-1}\times]$; for example, a mathematical symbol $[\omega\times]$ represents:

$$[\omega\times] = \begin{bmatrix} 0 & -\omega_3 & \omega_2 \\ \omega_3 & 0 & -\omega_1 \\ -\omega_2 & \omega_1 & 0 \end{bmatrix}$$

step 2.2: establishing a discrete angular velocity measurement model:

$$\tilde{\omega}_k = \omega_k + \frac{1}{2}[\beta_k + \beta_{k-1}] + \left[\frac{\sigma_v^2}{\Delta t} + \frac{1}{12}\sigma_u^2 \Delta t\right]^{1/2} N_v$$

$$\beta_k = \beta_{k-1} + \sigma_u \Delta t^{1/2} N_u$$

wherein $\tilde{\omega}_k$ represents a gyro output value at the k moment, $\omega_k$ represents a real gyro value at the k moment, $\beta_k$ represents a gyro drift at the k moment, $\sigma_v^2$ and $\sigma_u^2$ represents mean square errors of a gyro measurement noise and a drift noise, $N_v$ and $N_u$ represent a Gaussian white noise with a mean value of zero and a unit array with a variance of three dimensions;

step 2.3: establishing a star sensor observation model:

$$z_k = \begin{bmatrix} A(q)r_1 \\ A(q)r_2 \\ \vdots \\ A(q)r_L \end{bmatrix}_k + \begin{bmatrix} v_1 \\ v_2 \\ \vdots \\ v_L \end{bmatrix}_k$$

wherein $z_k$ represents a quantity measurement, $r_i$ represent an ith reference vector, $i=1,\ldots,L$, L represents a number of fixed stars observed by the star sensor; $v_i$ represents a zero-mean Gaussian white noise, with a covariance of $\sigma_i^2 I_{3\times3}$, while all $v_i$ covariances constitute a measurement variance $R_k$; and $A(q)$ represents an attitude matrix, which is defined as follows:

$$A(q) = (q_4^2 - p^T p)I_{3\times3} + 2pp^T - 2q_4[p\times]$$

wherein $p=[q_1\ q_2\ q_3]^T$ represents a quaternion vector part, and $[p\times]$ represents an antisymmetric matrix of p;

The step 3 comprises:

step 3.1.1: calculating the sigma point and the corresponding weight at the k−1 moment:

$$\chi_{0,k} = \hat{x}_k$$

$$\chi_{i,k} = \hat{x}_k + \left[\sqrt{(n+\kappa)(P_k+Q_k)}\right]_i, i=1,\ldots,n$$

$$\chi_{i,k} = \hat{x}_k - \left[\sqrt{(n+\kappa)(P_k+Q_k)}\right]_i, i=n+1,\ldots,n$$

$$w_0^m = \frac{\kappa}{(n+\kappa)}$$

$$w_0^c = \frac{\kappa}{(n+\kappa)}$$

$$w_i^m = w_i^c = \frac{1}{2(n+\kappa)}, i=1,\ldots,2n$$

wherein $(\sqrt{P_k})_i$ represents an ith column of $\sqrt{P_k}$, $w_0^m$, $w_0^c$, $w_i^m$ and $w_i^c$ represent the weights, n represents a state dimension, and $Q_k$ is a process noise, which is defined as follows:

$$Q_k = \frac{\Delta t}{2}\begin{bmatrix} \left(\sigma_v^2 - \frac{1}{6}\sigma_u^2 \Delta t^2\right)I_{3\times3} & 0_{3\times3} \\ 0_{3\times3} & \sigma_u^2 I_{3\times3} \end{bmatrix}$$

dividing the sigma point into an attitude error part and a gyro drift part:

$$\chi_{i,k} = \begin{bmatrix} \chi_{i,k}^{\delta p} \\ \chi_{i,k}^{\beta} \end{bmatrix}, i=0,1,\ldots,2n$$

step 3.1.2: calculating the quaternion to be propagated:

$$\hat{q}_{i,k-1} = \delta q_{i,k-1} \otimes \hat{q}_{0,k-1}, i=1,2,\ldots,2n$$

wherein $\otimes$ represents a quaternion product, and the error quaternion $$\delta q_{i,k-1} = \begin{bmatrix} \delta \rho_{i,k-1}^T & \delta q_{i,4_{k-1}} \end{bmatrix}^T, \delta q_{i,4_{k-1}} \text{ and } \delta \rho_{i,k-1}$$

are calculated by the following formula:

$$\delta q_4 = \frac{-a\|\delta p\|^2 + f\sqrt{f^2 + (1-a^2)\|\delta p\|^2}}{f^2 + \|\delta p\|^2}$$

$$\delta \rho = f^{-1}[a + \delta q_4]\delta p$$

wherein $\delta(\cdot)$ represents an error, $f^{-1}$ represents an inverse of f;

step 3.2: updating the quaternion by using the discrete quaternion motion equation; and $$\hat{q}_{i,k|k-1} = \Omega[\hat{\omega}_{i,k-1}]\hat{q}_{i,k-1}, i=0,1,\ldots,2n$$

then the error quaternion being obtained by the quaternion product:

$$\delta q_{i,k|k-1} = \hat{q}_{i,k|k-1} \otimes (\hat{q}_{0,k|k-1})^{-1}, i=1,\ldots,2n$$

the sigma point $X_{i,k|k-1}^{\delta p}$ of the attitude error part being solved by the following formula, $\delta p$ representing the generalized Rodrigue parameter:

$$\delta p \equiv f\frac{\delta \rho}{a + \delta q_4}$$

step 3.3: calculating the reference quaternion according to the following equation:

$$N(q_{1,k|k-1},\ldots,q_{2n,k|k-1})\hat{q}_{i,k|k-1} = \lambda \hat{q}_{i,k|k-1},$$
$$i=0,\ldots,2n$$

wherein $$N(q_{1,k|k-1},\ldots,q_{2n,k|k-1}) = \Sigma_{i=1}^{2n} Z(q_{i,k|k-1})$$
$$W_i Z^T(q_{i,k|k-1}),$$

$$Z(q_{i,k|k-1}) = \begin{bmatrix} q_{4,i,k|k-1} I_{3\times 3} + [\rho_{i,k|k-1} \times] \\ -\rho_{i,k|k-1}{}^T \end{bmatrix}, W_i = \frac{I_{3\times 3}}{2n},$$

$\lambda$ refers to a Lagrangian multiplicative factor, and an eigenvector corresponding to the minimum eigenvalue in a solution of equation is set as a reference quaternion $\bar{q}_{k|k-1}$, and $q_{4_{i,k|k-1}}$ represent values of a quaternion scalar part predicted at the k−1 moment corresponding to the ith sigma point;

step 3.4: propagating the gyro drift:

$$X_{i,k|k-1}{}^\beta = X_{i,k-1}{}^\beta, \quad i=0,1,\ldots,2n$$

step 3.5: estimating one-step prediction state and a corresponding error covariance as follows:

$$\hat{x}_{k|k-1} = \sum_{i=0}^{2n} w_i^m \chi_{i,k|k-1}$$

$$P_{k|k-1} = \sum_{i=0}^{2n} w_i^c (\chi_{i,k|k-1} - \hat{x}_{k|k-1})(\chi_{i,k|k-1} - \hat{x}_{k|k-1})^T + Q_{k-1}$$

step 3.6: updating the measurement, comprising:
step 3.6.1: recalculating the weight corresponding to the sigma point in the measurement updating part:

$$w_0^m = w_0^c = \varsigma$$

$$w_i^m = w_i^c = \frac{1}{2n}, \quad i=1,\ldots,2n$$

step 3.6.2: calculating the sigma point:

$$\gamma_{i,k|k-1} = \begin{bmatrix} A(\hat{q}_{i,k|k-1})r_1 \\ A(\hat{q}_{i,k|k-1})r_2 \\ \vdots \\ A(\hat{q}_{i,k|k-1})r_L \end{bmatrix}, \quad i=0,\ldots,2n$$

and step 3.6.3: calculating the one-step measurement prediction $\hat{z}_{k|k-1}$, the one-step measurement prediction variance $P_{zz,k|k-1}$ and the cross covariance $P_{xz,k|k-1}$ as follows:

$$\hat{z}_{k|k-1} = \sum_{i=0}^{2n} w_i^m \gamma_{i,k|k-1}$$

$$P_{zz,k|k-1} = \sum_{i=0}^{2n} w_i^c (\gamma_{i,k|k-1} - \hat{z}_{k|k-1})(\gamma_{i,k|k-1} - \hat{z}_{k|k-1})^T + R_k$$

$$P_{xz,k|k-1} = \sum_{i=0}^{2n} w_i^c (\chi_{i,k|k-1} - \hat{x}_{k|k-1})(\chi_{i,k|k-1} - \hat{z}_{k|k-1})^T$$

step 3.7: calculating a filtering gain $K_k$, a state vector $\hat{x}_k$ and a corresponding error covariance $P_k$ at the k moment:

$$K_k = P_{xz,k|k-1} P_{zz,k|k-1}{}^{-1}$$

$$\hat{x}_k = \hat{x}_{k|k-1} + K_k (z_k - \hat{z}_{k|k-1})$$

$$P_k = P_{k|k-1} - K_k P_{zz,k|k-1} K_k^T$$

wherein $\hat{x}_{k|k-1}$ represents a state one-step prediction amount of at the k−1 moment, $z_k$ represents an observation vector at the k moment, $P_{k|k-1}$ represents a one-step prediction covariance.

step 3.8: updating the quaternion:

$$\hat{x}_k = [\delta\hat{\rho}_k^T \hat{\beta}_k^T]^T$$

wherein $\hat{\beta}_k^T$ represents the transposition of a gyro drift estimation value at the k moment.

solve the error quaternion $\delta q_k = [\delta p_k^T \delta q_{4,k}]^T$ according to the formula of $\delta q_{i,4_{k-1}}$ and $\delta p_{i,k-1}$ in the step 3.1.2; according to the quaternion product, and using the eigenvector corresponding to the minimum eigenvalue obtained in the formula in the step 3.3 as the reference quaternion, then solving the quaternion at the k moment as follows:

$$\hat{q}_k = \delta q_k \otimes \bar{q}_{k|k-1}$$

and step 3.9: resetting $\delta\hat{\rho}_k$ as a zero vector to prepare for a next filtering cycle.

The method provided by the application is simulated by a Matlab simulation software under the following simulation condition:

In the step 2, an angular velocity is $\omega=[-1/(90/(2\pi)\times 60) \; 0 \; 0]^T$, a star sensor sampling frequency is 1 Hz, a star sensor measurement noise standard deviation is $\sigma_s=0.005$ deg, a gyro sampling frequency is $\Delta t=1$ s, a gyro measurement noise standard deviation is $$\sigma_u = \sqrt{10} \times 10^{-10} \frac{\text{rad}}{s^{3/2}},$$

a gyro drift noise standard deviation is $$\sigma_v = \sqrt{10} \times 10^{-7} \frac{\text{rad}}{s^{1/2}},$$

and the initial conditions are as follows: case 1, an initial attitude error is $[1° \; 1° \; 1°]^T$, and an initial attitude covariance is $(0.5°I_{3\times 3})^2$; case 2, the initial attitude error is $[30° \; 30° \; 30°]^T$ and the initial attitude covariance is $(30°)^2 I_{3\times 3}$; case 3, the initial attitude error is $[-50° \; 50° \; 160°]^T$, the initial attitude covariance is $(50°)^2 I_{3\times 3}$, an initial gyro drift from the case 1 to the case 3 is $[0.1° \; 0.1° \; 0.1°]^T$, and an initial gyro drift covariance is $$\left(\frac{0.2°}{h}\right)^2 I_{3\times 3};$$

and case 4, except the initial attitude error and the covariance error thereof are the same as those in the case 3, the initial gyro drift and the covariance error thereof are $[10° \; 20° \; 10°]^T$ and $$\left(\frac{20°}{h}\right)^2 I_{3\times 3}$$

respectively.

In the step 3, the weight parameter is $\kappa=-3$, $\varsigma=0$, and the generalized Rodrigue parameter is a=1, f=4.

In the step 4, the filtering time is $N_{time}=90$ min.

Figure 6:
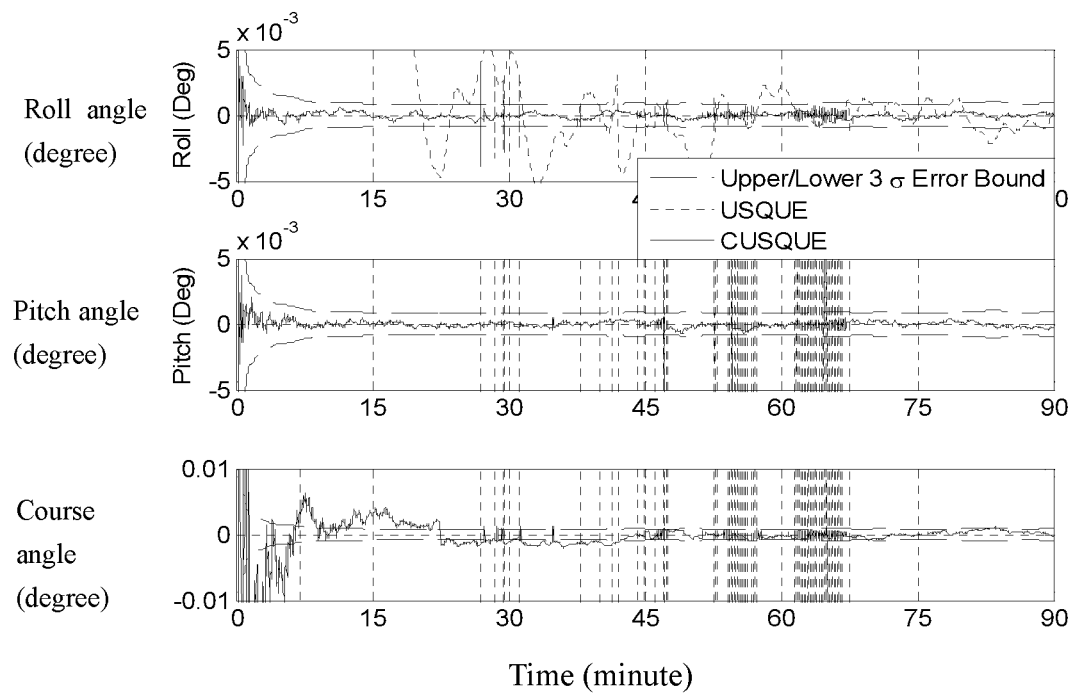
FIG. 6 is a comparison diagram of attitude angle error results of USQUE and CUSQUE in three directions under the initial condition error situation in the case 4.
Figure 7:
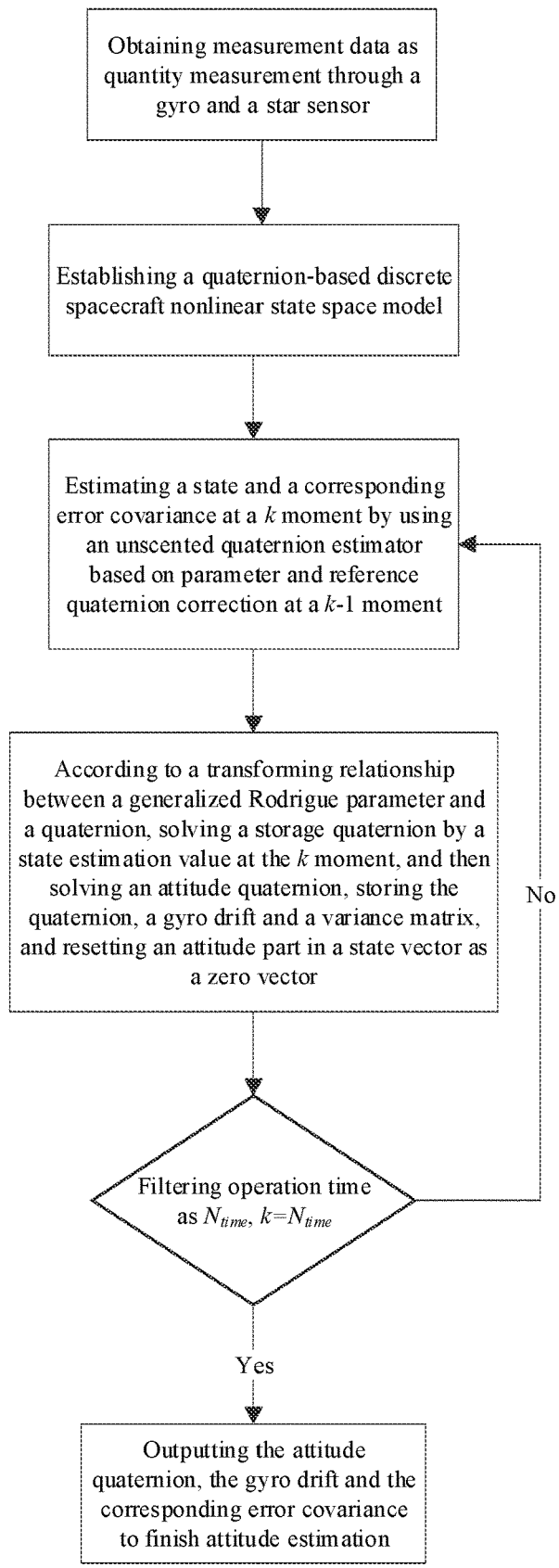
FIG. 7 is a flow chart of a weight and reference quaternion correction unscented quaternion estimation method.

The method (CUSQUE) provided in the application is compared with the existing nonlinear filtering algorithms comprising the MEKF, USQUE and Cubature Kalman Filter (CKF) algorithms. An simulation hardware environment is Inter (R) Core™ i5-2400 CPU @3. 10 GHz, 2. 00 GB RAM and Windows 7 operating system. In FIG. 2 to FIG. 5, a dotted line (:) represents the attitude angle root mean square error estimated by the MEKF, a dotted line ( -- ) represents the attitude angle root mean square error estimated by the USQUE, a dot lash line (-.) represents the attitude angle root mean square error estimated by the CKF, and a solid line (-) represents the attitude angle root mean square error estimated by the CUSQUE. In FIG. 6, the dotted line and solid line respectively represent the attitude angle errors estimated by the USQUE and the CUSQUE in three directions. From FIG. 2 to FIG. 5, it can be clearly found that the estimation accuracy of the CUSQUE is similar to other nonlinear filtering algorithms except in the case of a smaller initial condition error. In other cases, the estimation accuracy of the CUSQUE is higher than other algorithms, and it has a faster convergence speed. Through the comparison of FIG. 6, in the most dramatic case, the attitude angle errors of the CUSQUE in three directions converge within the boundary of three-time mean square covariance, which shows the effectiveness of the method proposed in the present invention.

The invention claimed is:

1. A weight and reference quaternion correction unscented quaternion estimation method, comprising:
   step 1: obtaining measurement data as quantity measurement through a gyro and a star sensor;
   step 2: establishing a quaternion-based discrete spacecraft nonlinear state space model;
   step 3: estimating an error quaternion, a gyro drift and a corresponding error covariance at a k moment by using an unscented quaternion estimator based on parameter and reference quaternion correction at a k−1 moment; and
   step 4: setting a filtering time as $N_{time}$, if $k<N_{time}$, then repeating the step 3, if $k=N_{time}$, then finishing filtering, and outputting the attitude quaternion, the gyro drift and the corresponding error covariance;
   the step 2 comprises:
   step 2.1: establishing a discrete quaternion state motion equation of a spacecraft;

$$\hat{q}_{k|k-1} = \Omega[\hat{\omega}_{k-1}]\hat{q}_{k-1} \qquad \text{Formula (1)}$$

$$\Omega[\hat{\omega}_{k-1}] = \begin{bmatrix} \cos(0.5\|\hat{\omega}_{k-1}\|\Delta t)I_{3\times3} - [\psi_{k-1}\times] & \psi_{k-1} \\ -\psi_{k-1}^T & \cos(0.5\|\hat{\omega}_{k-1}\|\Delta t)I_{3\times3} \end{bmatrix}$$

$$\psi_{k-1} = \frac{\sin(0.5\|\hat{\omega}_{k-1}\|\Delta t)\hat{\omega}_{k-1}}{\|\hat{\omega}_{k-1}\|}$$

wherein $q=[q_1\ q_2\ q_3\ q_4]^T$ represents a quaternion vector, $\Omega[\cdot]$ and $\psi_{k-1}$ represent function symbols at the k−1 moment, $\omega=[\omega_1\ \omega_2\ \omega_3]^T$ represents a gyro three-axis angular velocity output vector, $\hat{\omega}_{k-1}$ represents an angular velocity estimation value at the k−1 moment, $\hat{q}_{k-1}$ represents an estimation value of an attitude quaternion q at the k−1 moment, $I_{3\times3}$ represents an unit matrix of 3×3, $\Delta t$ represents a gyro sampling interval, $\|\cdot\|$ represents a vector norm, $\psi_{k-1}^T$ represents transposition of $\psi_{k-1}$, and $[\psi_{k-1}\times]$ represents an antisymmetry matrix of $[\psi_{k-1}\times]$;

step 2.2: establishing a discrete angular velocity measurement model:

$$\tilde{\omega}_k = \omega_k + \frac{1}{2}[\beta_k + \beta_{k-1}] + \left[\frac{\sigma_v^2}{\Delta t} + \frac{1}{12}\sigma_u^2\Delta t\right]^{1/2} N_v \qquad \text{Formula (2)}$$

$$\beta_k = \beta_{k-1} + \sigma_u \Delta t^{1/2} N_u \qquad \text{Formula (3)}$$

wherein $\tilde{\omega}_k$ represents a gyro output value at the k moment, $\omega_k$ represents a real gyro value at the k moment, $\beta_k$ represents a gyro drift at the k moment, $\sigma_v^2$ and $\sigma_u^2$ represents mean square errors of a gyro measurement noise and a drift noise, $N_v$ and $N_u$ represent a Gaussian white noise with a mean value of zero and a unit array with a variance of three dimensions;

step 2.3: establishing a star sensor observation model:

$$z_k = \begin{bmatrix} A(q)r_1 \\ A(q)r_2 \\ \vdots \\ A(q)r_L \end{bmatrix}_k + \begin{bmatrix} v_1 \\ v_2 \\ \vdots \\ v_L \end{bmatrix}_k \qquad \text{Formula (4)}$$

wherein $z_k$ represents a quantity measurement, $r_i$ represent an ith reference vector, i=1, . . . , L, L represents a number of fixed stars observed by the star sensor; $v_i$ represents a zero-mean Gaussian white noise, with a covariance of $\sigma_i^2 I_{3\times3}$, while all $v_i$ covariances constitute a measurement variance $R_k$; and A(q) represents an attitude matrix, which is defined as follows:

$$A(q)=(q_4^2-p^Tp)I_{3\times3}+2pp^T-2q_4[\rho\times] \qquad \text{Formula (5)}$$

wherein $\rho=[q_1\ q_2\ q_3]^T$ represents a quaternion vector part, and $[\rho\times]$ represents an antisymmetric matrix of $\rho$;

step 3.1: calculating a sigma point and a corresponding weight at the k−1 moment, and calculating a quaternion to be propagated;

step 3.2: updating the quaternion by using the discrete quaternion motion equation;

step 3.3: calculating the reference quaternion according to the following equation:

$$N(q_{1,k|k-1}, \ldots, q_{2n,k|k-1})\hat{q}_{i,k|k-1} = \lambda \hat{q}_{i,k|k-1},$$
$$i=0, \ldots, 2n \qquad \text{Formula (6)}$$

wherein $$N(q_{1,k|k-1}, \ldots, q_{2n,k|k-1}) = \Sigma_{i=1}^{2n} Z(q_{i,k|k-1}) W_i Z^T(q_{i,k|k-1}),$$

$$Z(q_{i_{Reject}k|k-1}) = \begin{bmatrix} q_{4i,k|k-1} I_{3\times3}[\rho_{i,k|k-1}\times] \\ -\rho_{i,k|k-1}^T \end{bmatrix} \text{ and } q_{4i,k|k-1}$$

represent values of a quaternion scalar part predicted at the k−1 moment corresponding to the ith sigma point, $$W_i = \frac{I_{3\times3}}{2n},$$

λ refers to a Lagrangian multiplicative factor, and an eigenvector corresponding to the minimum eigenvalue in a solution of equation is set as a reference quaternion $\bar{\hat{q}}_{k|k-1}$;

step 3.4: propagating the gyro drift:

$$\chi_{i,k|k-1}^\beta = \chi_{i,k-1}^\beta,\ i=0,1,\ldots,2n \qquad \text{Formula (7)}$$

step 3.5: estimating one-step prediction state and a corresponding error covariance as follows:

$$\hat{x}_{k|k-1} = \Sigma_{i=0}^{2n} w_i^m \chi_{i,k|k-1} \quad \text{Formula (8)}$$

$$P_{k|k-1} = \Sigma_{i=0}^{2n} w_i^c (\chi_{i,k|k-1} - \hat{x}_{k|k-1})(\chi_{i,k|k-1} - \hat{x}_{k|k-1})^T + Q_{k-1} \quad \text{Formula (9)}$$

wherein both $w_i^m$ and $w_i^c$ represent the weights;
step 3.6: updating the measurement;
step 3.7: calculating a filtering gain $K_k$, a state vector $\hat{x}_k$ and a corresponding error covariance $P_k$ at the k moment:

$$K_k = P_{xz,k|k-1} P_{zz,k|k-1}^{-1} \quad \text{Formula (10)}$$

$$\hat{x}_k = \hat{x}_{k|k-1} + K_k(z_k - \hat{z}_{k|k-1}) \quad \text{Formula (11)}$$

$$P_k = P_{k|k-1} - K_k P_{zz,k|k-1} K_k^T \quad \text{Formula (12)}$$

wherein $\hat{x}_{k|k-1}$ represents a state one-step prediction amount of at the k−1 moment, $z_k$ represents an observation vector at the k moment, $P_{k|k-1}$ represents a one-step prediction covariance, $\hat{z}_{k|k-1}$ represents one-step measurement prediction, $P_{zz,k|k-1}$ represents a one-step measurement prediction variance, and $P_{zz,k|k-1}$ represents a cross covariance;
step 3.8: updating the quaternion:

$$\hat{x}_k = [\delta\hat{p}_k^T \hat{\beta}_k^T]^T \quad \text{Formula (13)}$$

wherein $\hat{\beta}_k^T$ represents the transposition of a gyro drift estimation value at the k moment, and $\delta(\bullet)$ represents an error;
and step 3.9: resetting $\delta\hat{p}_k$ as a zero vector to prepare for a next filtering cycle.

2. The weight and reference quaternion correction unscented quaternion estimation method according to claim 1, wherein the step 3.1 comprises:
step 3.1.1: calculating the sigma point and the corresponding weight at the k−1 moment:

$$\chi_{0,k} = \hat{x}_k \quad \text{Formula (14)}$$

$$\chi_{i,k} = \hat{x}_k + \left[\sqrt{(n+\kappa)(P_k + Q_k)}\right]_i, i = 1, \ldots, n \quad \text{Formula (15)}$$

$$\chi_{i,k} = \hat{x}_k - \left[\sqrt{(n+\kappa)(P_k + Q_k)}\right]_i, i = n+1, \ldots, 2n \quad \text{Formula (16)}$$

$$w_0^m = \frac{\kappa}{(n+\kappa)} \quad \text{Formula (17)}$$

$$w_0^c = \frac{\kappa}{(n+\kappa)} \quad \text{Formula (18)}$$

$$w_i^m = w_i^c = \frac{1}{2(n+\kappa)}, i = 1, \ldots, 2n \quad \text{Formula (19)}$$

wherein $(\sqrt{P_k})_i$ represents an ith column of $\sqrt{P_k}$, $w_0^m$, $w_0^c$, $w_i^m$ and $w_i^c$ represent the weights, n represents a state dimension, k represents an unscented Kalman filtering adjustment parameter, and $Q_k$ is a process noise, which is defined as follows:

$$Q_k = \frac{\Delta t}{2} \begin{bmatrix} \left(\sigma_v^2 - \frac{1}{6}\sigma_u^2 \Delta t^2\right) I_{3\times 3} & 0_{3\times 3} \\ 0_{3\times 3} & \sigma_u^2 I_{3\times 3} \end{bmatrix} \quad \text{Formula (20)}$$

dividing the sigma point into an attitude error part and a gyro drift part:

$$\chi_{i,k} = \begin{bmatrix} \chi_{i,k}^{\delta p} \\ \chi_{i,k}^{\beta} \end{bmatrix}, i = 0, 1, \ldots, 2n \quad \text{Formula (21)}$$

step 3.1.2: calculating the quaternion to be propagated:

$$\hat{q}_{i,k-1} = \delta q_{i,k-1} \otimes \hat{q}_{0,k-1}, i = 1, 2, \ldots, 2n \quad \text{Formula (22)}$$

wherein $\otimes$ represents a quaternion product, and the error quaternion $$\delta q_{i,k-1} = \begin{bmatrix} \delta\rho_{i,k-1}^T & \delta q_{i,4_{k-1}} \end{bmatrix}^T, \delta q_{i,4_{k-1}} \text{ and } \delta\rho_{i,k-1}$$

are calculated by the following formula:

$$\delta q_4 = \frac{-a\|\delta p\|^2 + f\sqrt{f^2 + (1-a^2)\|\delta p\|^2}}{f^2 + \|\delta p\|^2} \quad \text{Formula (23)}$$

$$\delta\rho = f^{-1}[a + \delta q_4]\delta p \quad \text{Formula (24)}$$

wherein $\delta(\bullet)$ represents an error, $f^{-1}$ represents an inverse of f, and a and f represent generalized Rodrigue parameters.

3. The weight and reference quaternion correction unscented quaternion estimation method according to claim 2, wherein in the step 3.2, the discrete quaternion motion equation is represented as follows:

$$\hat{q}_{i,k|k-1} = \Omega[\hat{\omega}_{i,k-1}]\hat{q}_{i,k-1}, i = 0, 1, \ldots, 2n \quad \text{Formula (25)}$$

then the error quaternion is obtained by the quaternion product:

$$\delta q_{i,k|k-1} = \hat{q}_{i,k|k-1} \otimes (\hat{q}_{0,k|k-1})^{-1}, i = 1, \ldots, 2n \quad \text{Formula (26)}$$

the sigma point $X_{i,k|k-1}^{\delta p}$ of the attitude error part is solved by the following formula, $\delta p$ represents the generalized Rodrigue parameter:

$$\delta p \equiv f\frac{\delta\rho}{a + \delta q_4}. \quad \text{Formula (27)}$$

4. The weight and reference quaternion correction unscented quaternion estimation method according to claim 3, wherein the step 3.6 comprises:
step 3.6.1: recalculating the weight corresponding to the sigma point in the measurement updating part:

$$w_0^m = w_0^c = \varsigma \quad \text{Formula (28)}$$

$$w_i^m = w_i^c = \frac{1}{2n}, i = L, \ldots, 2n \quad \text{Formula (29)}$$

wherein $\varsigma$ represents the unscented Kalman filtering adjustment parameter;
step 3.6.2: calculating the sigma point:

$$\gamma_{i,k|k1} = \begin{bmatrix} A(\hat{q}_{i,k|k-1})r_1 \\ A(\hat{q}_{i,k|k-1})r_2 \\ \vdots \\ A(\hat{q}_{i,k|k1})r_L \end{bmatrix}, i = 0, \ldots, 2n \quad \text{Formula (30)}$$

and step 3.6.3: calculating the one-step measurement prediction $\hat{z}_{k|k-1}$, the one-step measurement prediction variance $P_{zz,k|k-1}$ and the cross covariance $P_{xz,k|k-1}$ as follows:

$$\hat{z}_{k|k-1} = \Sigma_{i=0}^{2n} w_i^m \gamma_{i,k|k-1} \qquad \text{Formula (31)}$$

$$P_{zz,k|k-1} = \Sigma_{i=0}^{2n} w_i^c (\gamma_{i,k|k-1} - \hat{z}_{k|k-1})(\gamma_{i,k|k-1} - \hat{z}_{k|k-1})^T + R_k \qquad \text{Formula (32)}$$

$$P_{xz,k|k-1} = \Sigma_{i=0}^{2n} w_i^c (X_{i,k|k-1} - \hat{x}_{k|k-1})(X_{i,k|k-1} - \hat{z}_{k|k-1})^T \qquad \text{Formula (33)}.$$

5. The weight and reference quaternion correction unscented quaternion estimation method according to claim 4, wherein in the step 3.8, the error quaternion $\delta q_k = [\delta p_k^T \ \delta q_{4,k}]^T$ is solved according to the formula of $\delta q_{i,4_{k-1}}$ and $\delta p_{i,k-1}$ in the step 3.1.2; according to the quaternion product, and using the eigenvector corresponding to the minimum eigenvalue obtained in the formula in the step 3.3 as the reference quaternion, the quaternion at the k moment is solved as follows:

$$\hat{q}_k = \delta q_k \otimes \bar{q}_{k|k-1} \qquad \text{Formula (34).}$$

\* \* \* \* \*